(12) United States Patent
Kim

(10) Patent No.: US 7,421,923 B2
(45) Date of Patent: Sep. 9, 2008

(54) ELECTRONIC GEARSHIFT STRUCTURE FOR VEHICLE

(75) Inventor: Young Kwang Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 262 days.

(21) Appl. No.: 11/342,795

(22) Filed: Jan. 31, 2006

(65) Prior Publication Data

US 2007/0137337 A1    Jun. 21, 2007

(30) Foreign Application Priority Data

Oct. 5, 2005    (KR) ...................... 10-2005-0093392

(51) Int. Cl.
F16H 59/04    (2006.01)
(52) U.S. Cl. .................. 74/473.12; 74/473.18
(58) Field of Classification Search .............. 74/473.12, 74/473.18; 701/52, 53

See application file for complete search history.

(56) References Cited

U.S. PATENT DOCUMENTS

| | | | | |
|---|---|---|---|---|
| 6,046,673 A * | 4/2000 | Michael et al. | ............. | 340/456 |
| 2003/0172757 A1 * | 9/2003 | Yone | ........................... | 74/335 |
| 2004/0216549 A1 * | 11/2004 | Shiomi et al. | ............ | 74/473.12 |
| 2005/0109145 A1 * | 5/2005 | Levin et al. | ............... | 74/473.12 |

* cited by examiner

Primary Examiner—Sherry Estremsky
Assistant Examiner—Edwin A Young
(74) Attorney, Agent, or Firm—Greenblum & Bernstein, P.L.C.

(57) ABSTRACT

An electronic gear shifter structure for a vehicle shift-by-wire system includes a shift lever that is manipulated for gear changes and equipped at one side surface thereof with a park range switch. An indicator is equipped at one side thereof with a gear range displayer for showing the present gear position according to the movement of the shift lever by a driver. A base plate is situated underneath the shift lever and indicator.

11 Claims, 6 Drawing Sheets

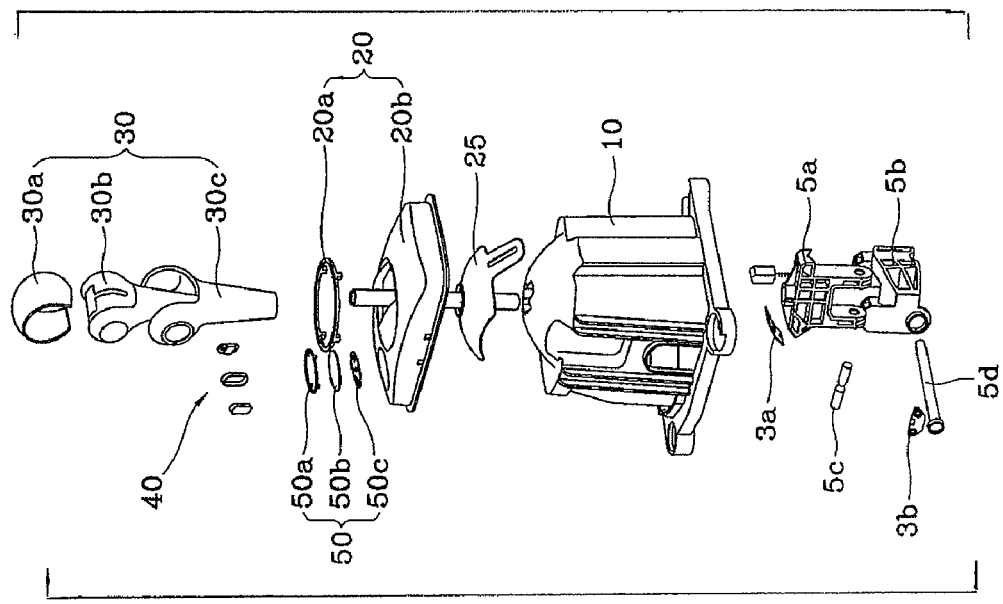
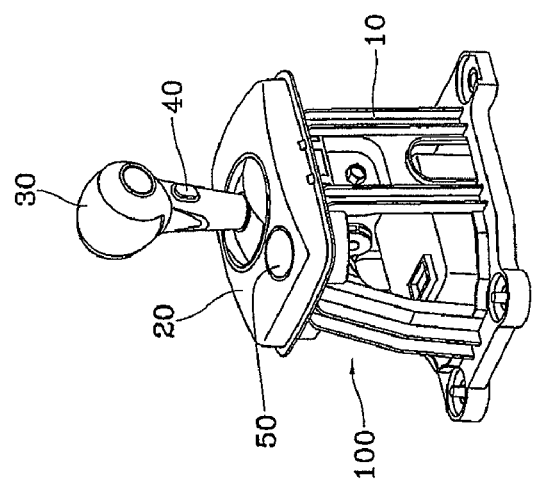

ELECTRONIC GEARSHIFT STRUCTURE FOR VEHICLE

CROSS-REFERENCE TO RELATED APPLICATIONS

The present application is based on, and claims priority from, Korean Application Serial Number 10-2005-0093392, filed on Oct. 5, 2005, the disclosure of which is hereby incorporated by reference herein in its entirety.

FIELD OF THE INVENTION

The present invention relates to an electronic gearshift structure incorporated in a vehicular shift-by-wire system.

BACKGROUND OF THE INVENTION

The shift-by-wire system is an advanced system that electronically controls the gear range by using an electronic shift lever, Electronic Control Unit (ECU), and actuator, which electrically makes the change of gear ratio via a mechanical linkage of the transmission and shift lever. The shift lever of the shift-by-wire system has no mechanical cable connection and should be equipped with a position sensor for generating an electronic signal according to a driver's manipulation. Under such construction, the manipulation force and/or shift feel of the lever is superior and the gears are shifted by a simple maneuver of a switch button.

The shift-by-wire system includes the gearshift lever typically moving along an H-shaped cavity, T-shaped cavity, or Step-gate path. However, a gearshift lever with an H or T-shaped cavity must be manipulated with a push button at a side of the knob for the operation of the lever. Also, the gear range can inadvertently be operated along the step-gate path. Once being shifted, the lever is fixed to the shifted position such that it is difficult to apply above shift paths to the shift-by-wire system.

A trigger type lever having two gear ranges in one direction has been used to overcome the above drawbacks. However, the lever is restored to its original position during the shifting. This tends to cause the driver to mismanage the lever.

SUMMARY OF THE INVENTION

Embodiments of the present invention provide an electronic gear shifter structure for a shift-by-wire system.

An electronic gear shifter structure for a vehicle shift-by-wire system comprises a shift lever that is manipulated for gear changes and equipped at one side surface thereof with a park "P" range switch. An indicator may be equipped at one side thereof with a gear range displayer for showing the present gear position according to the movement of the shift lever by a driver. A base plate may be situated underneath the shift lever and indicator.

BRIEF DESCRIPTION OF THE DRAWINGS

For a better understanding of the nature and objects of the present invention, reference should be made to the following detailed description with the accompanying drawings, in which:

FIG. 1a is a constitutional view of an electronic gear shifter according to an embodiment of the present invention;

FIG. 1b is a detailed view of a gearshift lever illustrated in FIG. 1a;

DETAILED DESCRIPTION OF THE PREFERRED EMBODIMENTS

Figure 2A:
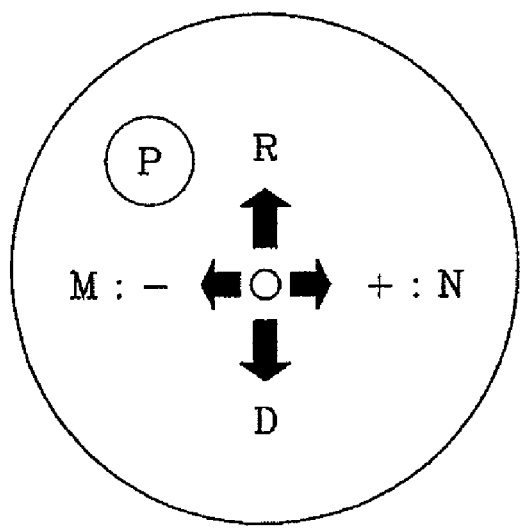
FIG. 2a-2c depicts a shift pattern of an electronic gear shifter.

With reference to FIGS. 1a and 1b, an electronic gear shifter 100 according to an embodiment of the invention includes a shift lever 30 manipulated for gear changes and equipped at one side surface thereof with a park "P" range switch 40. An indicator 20 is equipped at one side thereof with a gear range displayer 50 showing the present gear position according to the movement of shift lever 30 by the driver. A base plate 10 is situated underneath shift lever 30 and indicator 20.

A slider 25 is inbetween indicator 20 and base plate 10 for a smooth slide of shift lever 30.

Shift lever 30 includes a knob core 30b, a knob cover 30a enclosing the knob core, and a knob housing 30c in which the knob core is disposed.

Through a trigger method, shift lever 30 is returned to the center position after the shift manipulation. When the ignition key is turned on, shift lever 30 is set into an automatic-shifting mode.

Figure 2B:
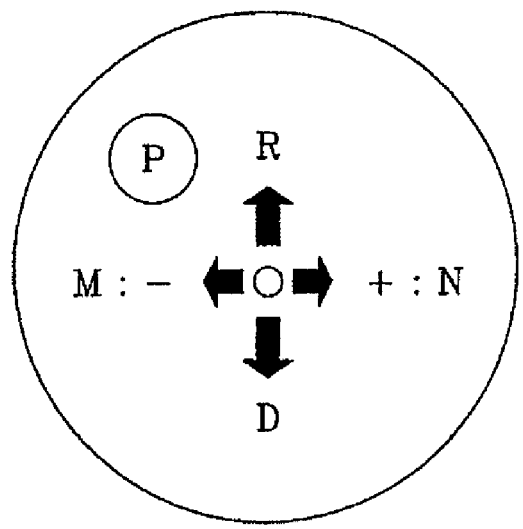
Figure 2C:
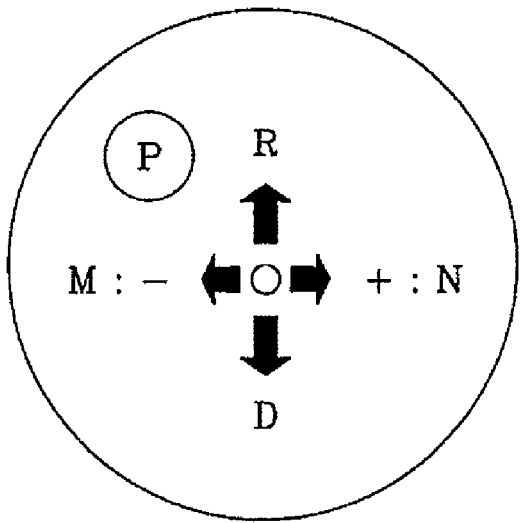

A shift pattern of shift lever 30 according to the embodiment of the invention will be described in reference to FIG. 2a-2c.

Figure 3A:
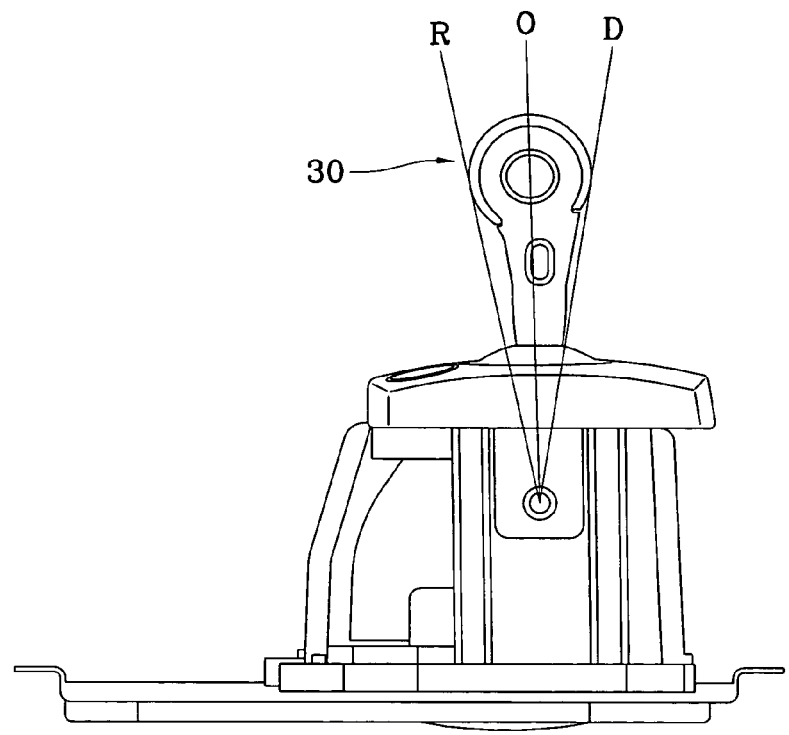
FIG. 3a is side view illustrating a movement of an electronic gear shifter.
Figure 3B:
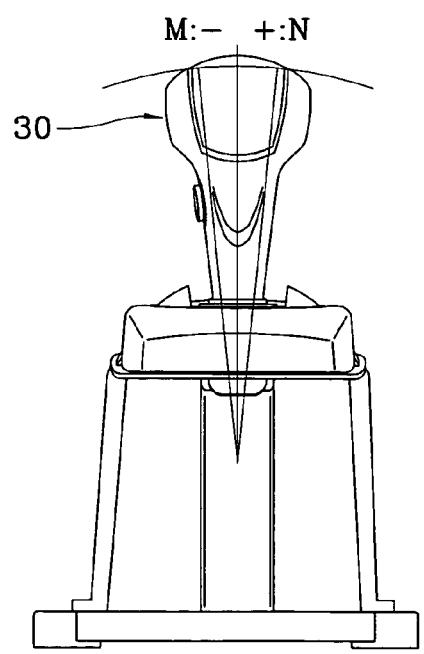
FIG. 3b is front view illustrating a movement of an electronic gear shifter.

The upward movement of shift lever 30 sets a reverse "R" range, while the downward movement is a drive "D" range. The rightward shift of shift lever 30 represents a neutral "N" range for an automatic-shifting mode or a shift up (+) in case of a manual-shifting mode. The leftward shift of shift lever 30 represents a modification "M" range for selecting either the automatic-shifting mode or manual-shifting mode, or a shift down (−) in case of a manual-shifting mode. The moving path of shift lever 30 is illustrated in FIGS. 3a and 3b.

Figure 4:
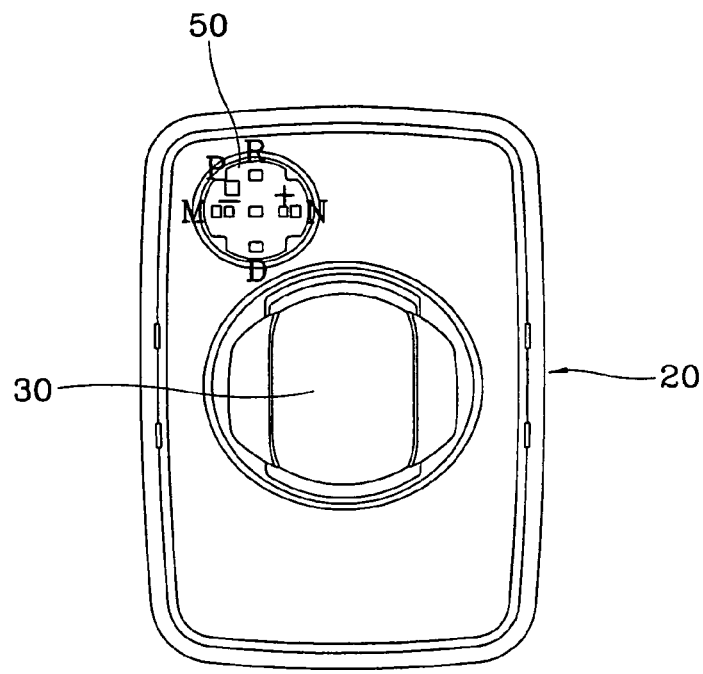
FIG. 4 illustrates a gear range displayer located on an indicator of an electronic gear shifter.

Gear range displayer 50 includes, as illustrated in FIGS. 1b and 4, a slider 50a, illuminating window 50b, and light printed circuit board (PCB) plate 50c.

Figure 5:
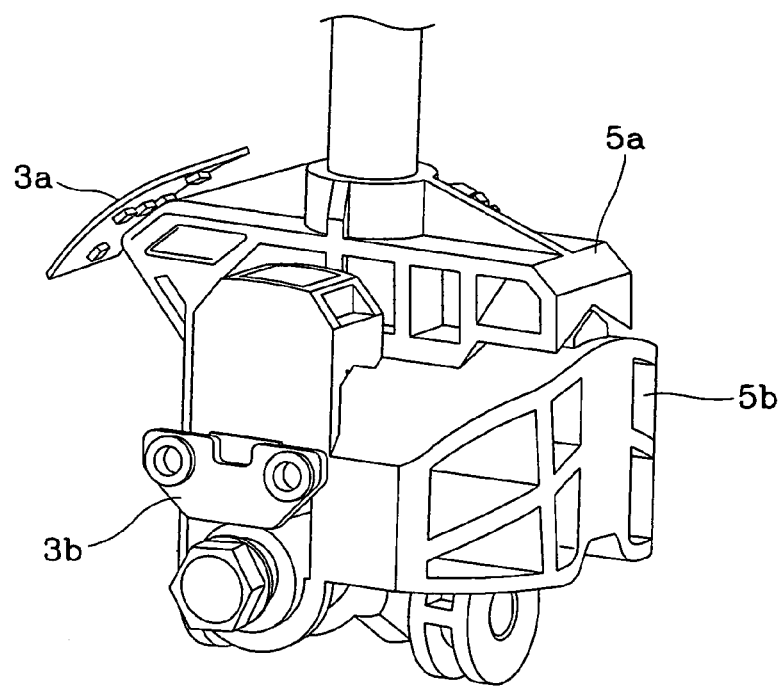
FIG. 5 is a detailed view of a lateral pivot bracket and an anteroposterior pivot bracket of an electronic gear shifter.
Figure 6A:
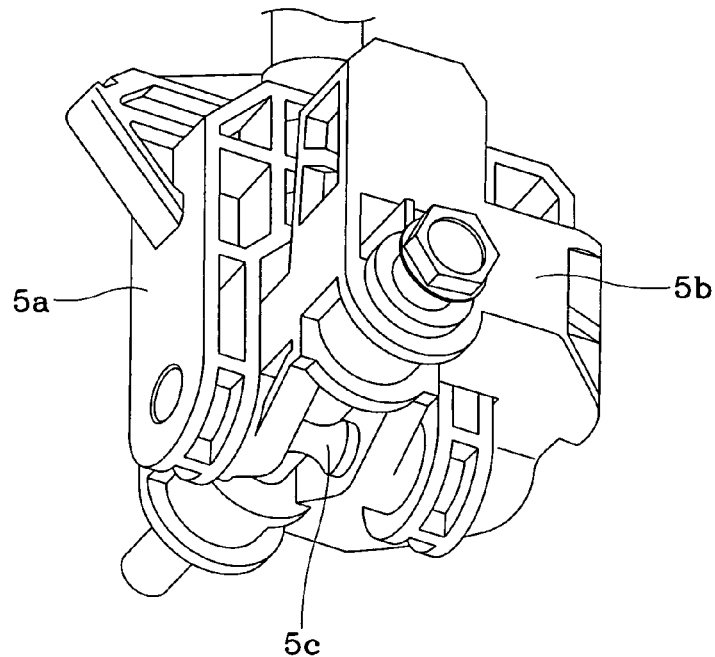
FIG. 6a illustrates a lateral pivot shaft of an electronic gear shifter.
Figure 6B:
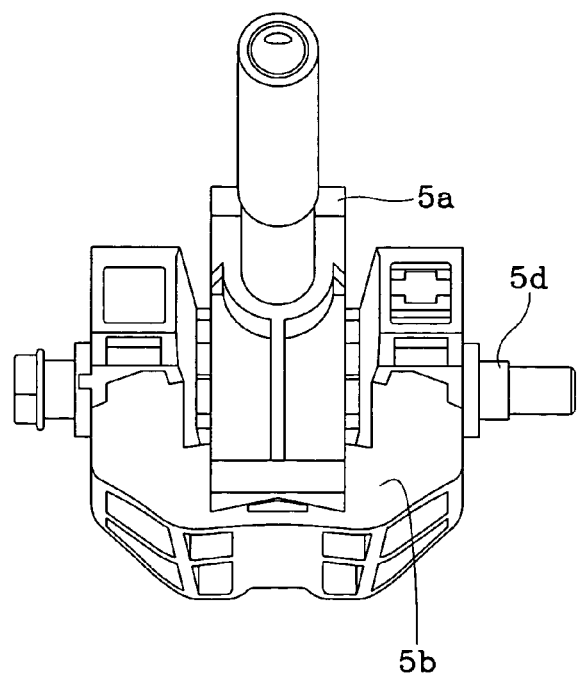
FIG. 6b illustrates an anteroposterior pivot shaft of an electronic gear shifter.

With reference to FIG. 5, a lateral pivot bracket 5a and anteroposterior pivot bracket 5b are equipped in base plate 10, wherein lateral pivot bracket 5a allows shift lever 30 to laterally move in relation to a lateral pivot shaft 5c, and anteroposterior pivot bracket 5b allows shift lever 30 to move back and forth in relation to an anteroposterior pivot shaft 5d. The structure of lateral pivot shaft 5c for the lateral movement of shift lever 30 is illustrated in FIG. 6a, while the structure of anteroposterior pivot shaft 5d for the back and forth movement of shift lever 30 is illustrated in FIG. 6b.

Figure 7:
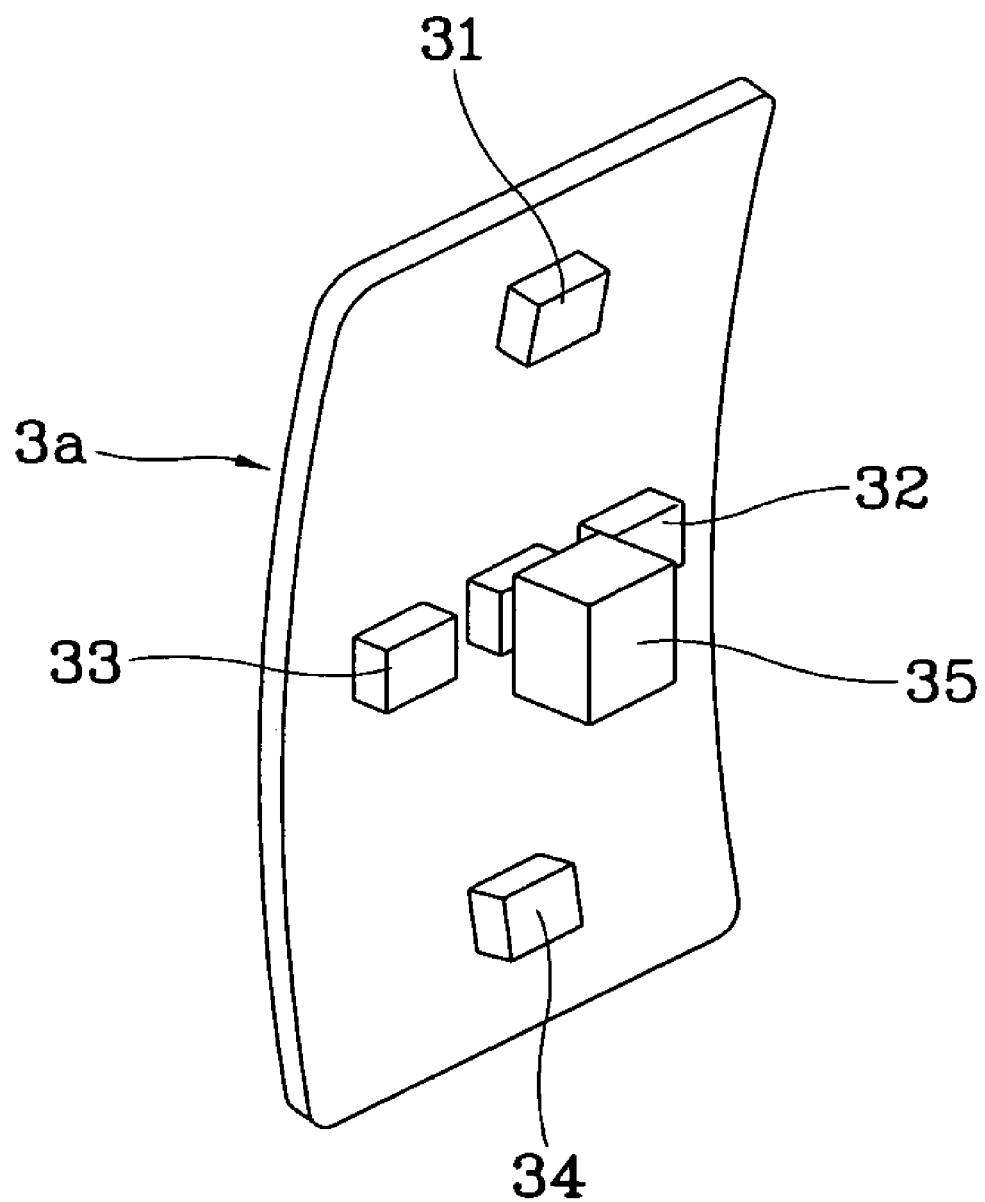
FIG. 7 is a detailed view of a primary position sensor of an electronic gear shifter.

Referring back to FIG. 5, a primary position sensor 3a is provided to detect a manipulation of shift lever 30. An auxiliary position sensor 3b is activated when the primary position sensor fails to operate. The structure of primary position sensor 3a is shown in FIG. 7.

Primary position sensor 3a is performed in a Hall Magnet manner where hall sensors are located at each gear range for corresponding to the position change of a magnet 35. The hall sensors of primary position sensor 3a include an R detecting hall integrated circuit (IC) 31 for detecting the R range, a +/N detecting hall IC 32 for detecting the +/N range, an M/− detecting hall IC 33 for detecting the M/− range, and a D detecting hall IC 34 for detecting the D range.

In case of the malfunction of the primary position sensor, auxiliary position sensor 3b is further provided to detect the voltage value of the present position of shift lever 30 and then determine the present gear position via the detected value.

With reference to FIGS. 1a and 2a -2c, the operation of the electronic gear shifter is as follows.

Shift lever 30 can embody either an automatic shift or a manual shift depending on the vertical and lateral manipulation, and the range P is performed by switch 40 located at a side of the knob.

The shift pattern of the shift lever is set in the R (upward shift), D (downward shift), N (rightward shift), and M (leftward shift). The shift up (+) or shift down (−) is executed in the manual-shifting mode according to the +/−manipulation. The manual-shifting mode can be converted into the automatic-shifting mode by selecting either the R or D.

If the primary position sensor detects that the present selected switch is M/− in a manual-shifting mode, the shift down (−) is performed, however, if the present shift mode is in an automatic mode, the present mode is converted into the manual mode to perform the shift down (−).

In case the present selected switch is +/N in a manual mode, the shift up (+) is carried out, however, the N mode is performed in case the shift mode is in the automatic mode.

If the present selected switch is neither M/− nor +/N (i.e., if the R or D is selected) while the present shift mode is in a manual mode, the shift mode is converted into an automatic mode to perform the R or D range. If the present shift mode is in the automatic mode, the selected gear range, either R or D, is performed.

Thus, electronic gear shifter 100 for a shift-by-wire system of a vehicle can be implemented by a simple manipulation.

The technical concept of the present invention is not limited to the above embodiment but should be determined by a logical interpretation on the basis of the claims of the present invention.

As apparent from the foregoing, there is an advantage in that the electronic gear shifter for the vehicle is facilitated in manipulation and reduced in vibration during the gear shifting without recourse to a mechanical linkage. The park range is also performed by a simply manipulation of a button.

What is claimed is:

1. An electronic gear shifter structure for a vehicle shift-by-wire system, comprising:
    a shift lever manipulable to change gears and provided at one side of the electric gear shifter structure with a park range switch;
    an indicator provided at one side of the electric gear shifter structure with a gear range displayer that shows a present gear position according to a movement of said shift lever;
    a base plate situated underneath said shift lever and said indicator;
    a primary position sensor that detects a present gear position during a manipulation of the shift lever; and
    an auxiliary position sensor that detects a voltage value of a present position of the shift lever.

2. The structure as defined in claim 1, wherein a shift pattern of said shift lever is set to be a reverse range as a result of an upward movement, a drive range as a result of a downward movement, a neutral range as a result of a rightward shift in the event of an automatic-shifting mode or a shift up (+) in the event of a manual-shifting mode, and a modification range as a result of a leftward shift to select either said automatic-shifting mode or manual-shifting mode, or a shift down (−) in the event of the manual-shifting mode.

3. The structure as defined in claim 1, wherein said shift lever comprises:
    a knob core;
    a knob cover enclosing said knob core; and
    a knob housing in which said knob core is disposed.

4. The structure as defined in claim 1, wherein said gear range displayer comprises:
    a slider;
    an illuminating window; and
    a light printed circuit board plate.

5. The structure as defined in claim 1, further comprising a lateral pivot bracket and an anteroposterior pivot bracket provided in said base plate, wherein said lateral pivot bracket allows said shift lever to laterally move in relation to a lateral pivot shaft, and said anteroposterior pivot bracket allows said shift lever to move back and forth in relation to an anteroposterior pivot shaft.

6. The structure as defined in claim 1, where hall sensors are located at each gear range corresponding to a position change of a magnet.

7. The structure as defined in claim 6, wherein said hall sensors of said primary position sensor comprise:
    a reverse detecting hall integrated circuit that detects a reverse range;
    a shift up/neutral detecting hall integrated circuit that detects a shift up/neutral range;
    a modification/shift down detecting hall integrated circuit that detects a modification/shift down range; and
    a drive detecting hail integrated circuit that detects a drive range.

8. The structure as defined in claim 1, wherein said shift lever is returned to a center position after a shift manipulation by a trigger.

9. The structure as defined in claim 1, wherein when an ignition key is turned on, said shift lever is set into an automatic-shifting mode.

10. The structure as defined in claim 1, further comprising a slider interposed between said indicator and said base plate to provide a slide of said shift lever.

11. An electronic gear shifter structure for a vehicle shift-by-wire system, comprising:
    a shift lever manipulable to change gears and provided at one side of the electric gear shifter structure with a park range switch;
    an indicator provided at one side of the electric gear shifter structure with a gear range displayer that shows a present gear position according to a movement of said shift lever;
    a base plate situated underneath said shift lever and said indicator;
    a primary position sensor that detects a present gear position during a manipulation of said shift lever where hall sensors are located at each gear range corresponding to a position change of a magnet; and
    an auxiliary position sensor that detects a voltage value of a present position of said shift lever and then determines a present gear position via the detected value only if said primary position sensor fails in detection of the present gear position during the manipulation of said shift lever.

* * * * *